US012566039B2

(12) United States Patent
    Platt

(10) Patent No.: US 12,566,039 B2
(45) Date of Patent: Mar. 3, 2026

(54) UNDERLAP STABILIZING STAND

(71) Applicant: Shawn Platt, Malabar, FL (US)

(72) Inventor: Shawn Platt, Malabar, FL (US)

( * ) Notice: Subject to any disclaimer, the term of this patent is extended or adjusted under 35 U.S.C. 154(b) by 0 days.

(21) Appl. No.: 19/240,067

(22) Filed: Jun. 17, 2025

(65) Prior Publication Data

US 2025/0389509 A1      Dec. 25, 2025

Related U.S. Application Data

(60) Provisional application No. 63/663,735, filed on Jun. 25, 2024.

(51) Int. Cl.
    *F41A 23/16*      (2006.01)
    *A01M 31/02*      (2006.01)
    *F16M 11/08*      (2006.01)
    *F16M 11/20*      (2006.01)
    *F16M 11/28*      (2006.01)

(52) U.S. Cl.
    CPC ............. *F41A 23/16* (2013.01); *A01M 31/02* (2013.01); *F16M 11/08* (2013.01); *F16M 11/2014* (2013.01); *F16M 11/28* (2013.01)

(58) Field of Classification Search
    CPC .......... F41A 23/06; F41A 23/04; F41A 23/16; F41C 33/001; A01M 31/02; F16M 11/08; F16M 11/2014; F16M 11/28
    See application file for complete search history.

(56) References Cited

U.S. PATENT DOCUMENTS

| | | | | |
|---|---|---|---|---|
| 2,950,836 A | * | 8/1960 | Murdock ............ | A24F 19/0092 |
| | | | | 297/188.2 |
| 3,225,656 A | * | 12/1965 | Flaherty ................. | F41A 23/06 |
| | | | | 89/37.04 |
| 3,428,286 A | * | 2/1969 | Pesco ..................... | F16M 13/02 |
| | | | | 248/278.1 |
| 4,575,964 A | * | 3/1986 | Griffin ................... | F16M 11/28 |
| | | | | 42/94 |
| 5,284,280 A | * | 2/1994 | Stonebraker, Sr. ....... | A45F 4/02 |
| | | | | 224/907 |
| 5,414,949 A | * | 5/1995 | Peebles ................... | F41A 23/16 |
| | | | | 89/37.04 |
| D382,035 S | * | 8/1997 | Swicegood .................. | D22/199 |
| 5,738,256 A | * | 4/1998 | Goff .......................... | A45F 5/00 |
| | | | | 224/908 |
| 5,862,967 A | * | 1/1999 | Johnson .................... | A45F 3/08 |
| | | | | 224/908 |
| 5,903,995 A | * | 5/1999 | Brubach ................. | F41A 23/06 |
| | | | | 42/90 |
| 5,930,931 A | * | 8/1999 | Watson ................... | F41A 23/04 |
| | | | | 206/317 |
| 6,042,080 A | * | 3/2000 | Shepherd ............... | B60R 11/00 |
| | | | | 248/688 |

(Continued)

*Primary Examiner* — Joshua E Freeman
(74) *Attorney, Agent, or Firm* — Bullock Law; Stephen Bullock

(57) ABSTRACT

An underlap stabilizing stand including a holder structured to support an elongate object therein, an upper swivel, a base, a lower swivel, and a longitudinal support between the holder and the base. The holder is connected to the longitudinal support via the upper swivel and the base is connected to the longitudinal support via the lower swivel. The underlap stabilizing stand is structured to stabilize, position and aim the elongate object along x, y, and z axes of the underlap stabilizing stand.

20 Claims, 6 Drawing Sheets

(56)     References Cited

U.S. PATENT DOCUMENTS

| | | | |
|---|---|---|---|
| 6,253,482 B1 * | 7/2001 | Peterson | F41A 23/16 |
| | | | 42/94 |
| 6,793,108 B2 * | 9/2004 | Williams, Jr. | B60R 7/14 |
| | | | 224/558 |
| 8,539,709 B2 * | 9/2013 | Otto | F41C 23/18 |
| | | | 73/167 |
| 8,763,297 B2 * | 7/2014 | Boll | F41A 23/04 |
| | | | 42/94 |
| 2014/0001801 A1 * | 1/2014 | Hutchinson | A01M 31/02 |
| | | | 297/217.1 |
| 2014/0082988 A1 * | 3/2014 | Boll | F41A 23/04 |
| | | | 42/94 |
| 2015/0362277 A1 * | 12/2015 | Frey | F41A 23/06 |
| | | | 42/94 |
| 2018/0125061 A1 * | 5/2018 | Komater | F16M 11/28 |
| 2018/0199724 A1 * | 7/2018 | Bray | F16M 11/041 |

* cited by examiner

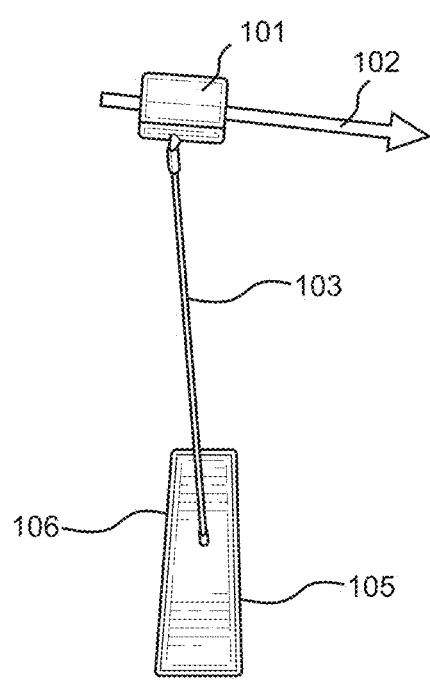
FIG. 3
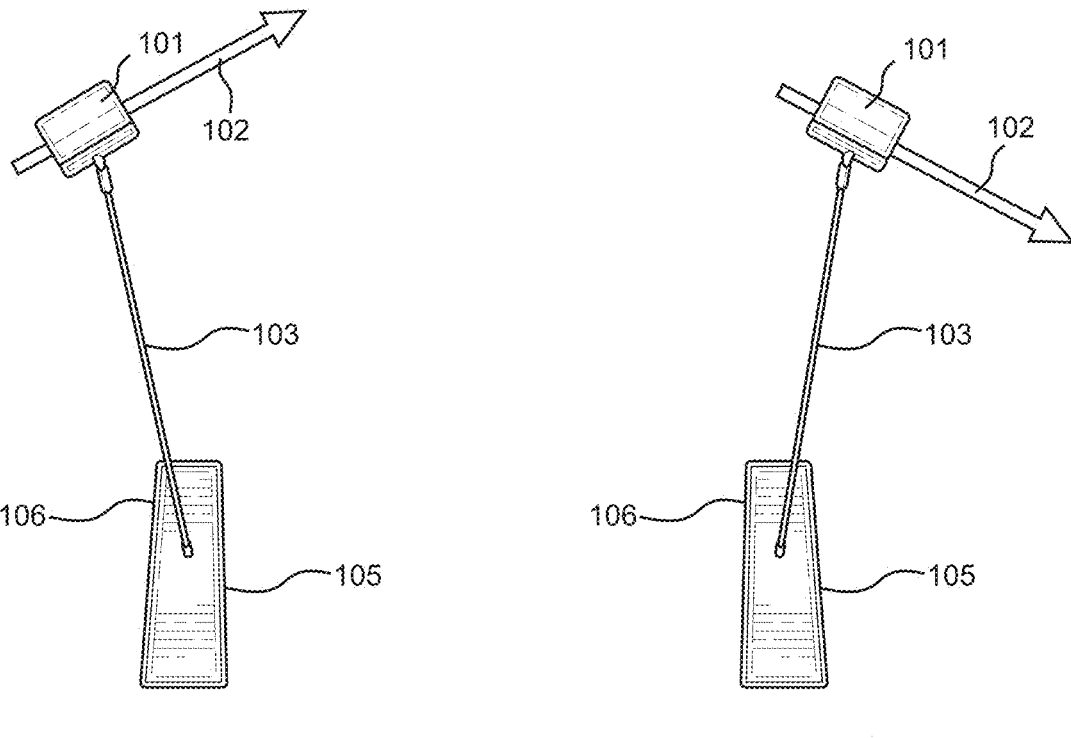
FIG. 4A                 FIG. 4B

UNDERLAP STABILIZING STAND

FIELD OF THE INVENTION

The present invention relates to stabilizing rifle stands for hunting. In particular, the present invention relates to an underlap stabilizing stand and associated methods.

BACKGROUND

When on an excursion, hunters are often packing as light as possible and trekking into uninhabited remote areas. They are unable to carry heavy and cumbersome stands and oftentimes move from area to area. Building a hunting stand is not always a practical solution and neither is transporting a large hunting stand when they move areas. Therefore, there exists a need in the art for a light and portable stabilizing stand to assist hunters as shown and described herein.

SUMMARY OF THE INVENTION

Embodiments of the present invention are related to an underlap stabilizing stand including a holder structured to support an elongate object therein, an upper swivel, a base, a lower swivel, and a longitudinal support between the holder and the base. The holder may be connected to the longitudinal support via the upper swivel and the base may be connected to the longitudinal support via the lower swivel. The underlap stabilizing stand is structured to stabilize, position and aim the elongate object along x, y, and z axes of the underlap stabilizing stand.

The holder may be a semi-cylindrical open-ended cup with interior support padding and the base may be dimensioned to support the underside of a user's lap seated thereon. In some embodiments the elongate object may be a firearm. Additionally, the longitudinal support extends distally from the base center. The base may be rectangular and the longitudinal support is structured to rest between a user's legs. A securing strap may be fixedly attached to a side of the holder and removably attached to an opposing side of the holder. The upper swivel and lower swivel include tightening components structured to secure the holder and the longitudinal support into a user selected position.

Another embodiment may include an underlap stabilizing stand including a holder structured to support an elongate object therein, an upper swivel, a base, a lower swivel, and a telescopic longitudinal support between the holder and the base structured to adjust between an extended first position and a compacted second position. The holder may be connected to the longitudinal support via the upper swivel and the base may be connected to the longitudinal support via the lower swivel. The underlap stabilizing stand is structured to stabilize, position and aim the elongate object along x, y, and z axes of the underlap stabilizing stand.

In this embodiment, the upper swivel, lower swivel, holder and base may be structured to allow a user to orient and aim a rifle placed in the holder in a forward, backward, sideways, upward and downward position relative to a user seated on the base. The telescopic longitudinal support may be structured to be tightened and secured into a desired height anywhere between the extended first position and the compacted second position via at least one of a twist lock, clamp lock, and friction lock at segmented points on the telescopic longitudinal support. Furthermore, the telescopic longitudinal support may be structured to tighten in the compacted second position and lay flat against the base to facilitate transport and storage. Additionally, the securing strap may be removably attached to opposing sides of the holder.

Another embodiment may include an underlap stabilizing stand including a holder structured to support an elongate object therein, an upper swivel, a base, a lower swivel, and a telescopic longitudinal support between the holder and the base structured to adjust between an extended first position and a compacted second position, and a pair of shoulder straps attached to the base. The holder may be connected to the longitudinal support via the upper swivel and the base may be connected to the longitudinal support via the lower swivel. The underlap stabilizing stand is structured to stabilize, position and aim the elongate object along x, y, and z axes of the underlap stabilizing stand.

In this embodiment, the shoulder straps may be fixedly attached to the base on a base surface opposite the lower swivel. However, in other embodiments, the shoulder straps may be fixedly attached to the base on a base surface including the lower swivel. The telescopic longitudinal support may be structured to tighten in the compacted second position and lay flat against the base to facilitate transport and storage via at least one of a twist lock, clamp lock, and friction lock at segmented points on the longitudinal support.

BRIEF DESCRIPTION OF THE DRAWINGS

FIG. 3 is a side view of the underlap stabilizing stand illustrated in FIG. 1.

FIG. 4A is a side view of the underlap stabilizing stand illustrated in FIG. 1 in a different orientation.

FIG. 4B is a side view of the underlap stabilizing stand illustrated in FIG. 1 in a different orientation.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figures 1, 2A, 2B:
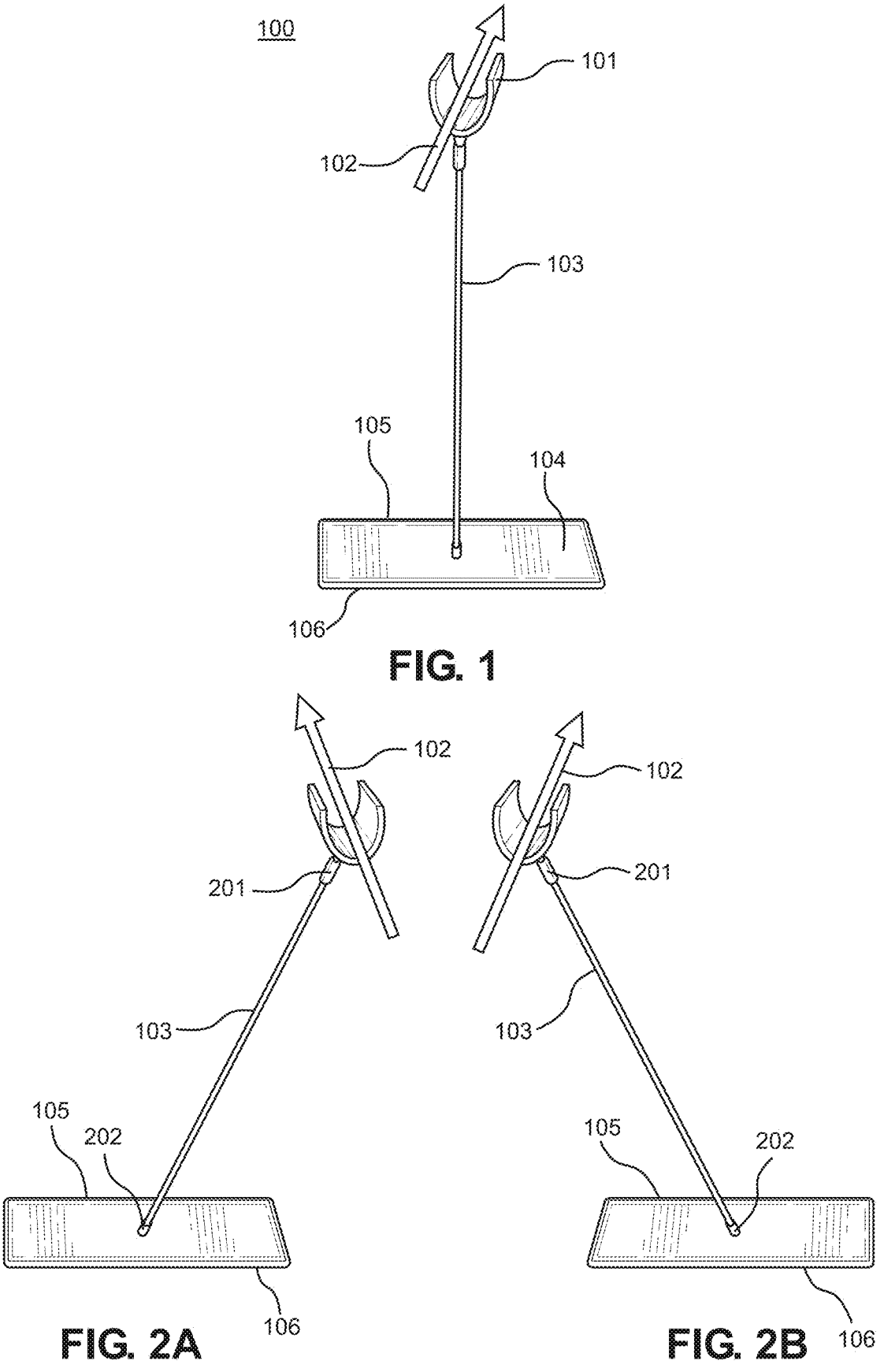
FIG. 1 is a back view of the underlap stabilizing stand according to an embodiment of the invention.
FIG. 2A is a back view of the underlap stabilizing stand illustrated in FIG. 1 in a different orientation.
FIG. 2B is a back view of the underlap stabilizing stand illustrated in FIG. 1 in a different orientation.

Referring now to FIG. 1, the underlap stabilizing stand 100, hereinafter referred to as the stand 100, will be described more fully. The stand 100 may include a holder 101, which in some embodiments may be a semi-cylindrical open-ended cup shape capable of holding an elongate object 102 such as a firearm or rifle therein. The stand 100 may also include a base 104, which in some embodiments may be a flat rectangular member used as a foundation to support the stand 100. The base 104 may further be support for the stand 100 when a user sits thereon. In this instance, the base 104 may be held in place by the user's underlap whereby each user leg may sit atop a longitudinal side of the base 104.

The base 104 may include a front 105 and a back 106. Connecting the base 104 to the holder 101 may be a longitudinal support 103. The longitudinal support 103 may be sized according to an average user's torso ranging from their lap or underlap to their shoulders. It may be located at the center of the base 104 and extend distally to the holder 101. In some embodiments, as will be described hereafter, the longitudinal support 103 may be telescopic with securing members to allow it to be adjusted and held in place at a desired height.

FIGS. 2A and 2B illustrate the versatility of the stand 100. As shown, the longitudinal support 103 may be attached to the holder 101 via an upper swivel 201 and the base 104 may be attached to the longitudinal support 103 via a lower swivel 202. The upper swivel 201 may allow for the holder 101 and a respective elongate object 102 to be rotated in all directions so that the elongate object 102 may be pointed at a desired target.

In FIG. 2A the elongate object 102 is pointed toward the upper left and in FIG. 2B it is pointed upward and right. However, one skilled in the art will appreciate that there are unlimited number of angles and positions that may be realized with the upper swivel 201 in conjunction with the holder 101. Similarly, the lower swivel 202 allows for the longitudinal support 103 to be rotated and oriented in an unlimited number of angles and positions relative to the base 104. As shown in FIG. 2A, it is leaning the longitudinal support 103 toward the right and aiming the holder 101 and elongate object 102 to the left. Likewise, in FIG. 2B it is leaning the longitudinal support 103 to the left and aiming the holder 101 and longitudinal support 103 to the right. However, one skilled in the art will appreciate that there are unlimited number of angles and positions that may be realized with the upper and lower swivels 201, 202 in conjunction with the longitudinal support 103.

FIGS. 3, 4A and 4B also show the versatility of the stand 100. In FIG. 3, the stand 100 is shown in a more traditional orientation with the longitudinal support 103 being positioned mostly perpendicular to the base 104 and the elongate object 102 and holder 101 being positioned mostly perpendicular to the longitudinal support 103. It is worth noting that the elongate object 102 is pointing outward relative to the front 105 of the base 104 and a user would be oriented with their back in line with the base back 106 and their front facing the base front 105. The user would also be sitting on the base 104 with the base 104 underneath their lap and the longitudinal support 103 between their legs.

FIG. 4A illustrates that the longitudinal support 103 may be tilted back and the upward swivel 201 with holder 101 may be tilted upward allowing a user to aim the elongate object 102 toward the sky. This would be ideal, for example, if a user were bird hunting from the ground. FIG. 4B illustrates that the longitudinal support 103 may be tilted forward and the upward swivel 201 and holder 101 may be tilted downward allowing a user to aim the elongate object 102 toward the ground. This would be ideal, for example, if a user were hunting land roaming animals from a tree.

Figures 4C, 4D:
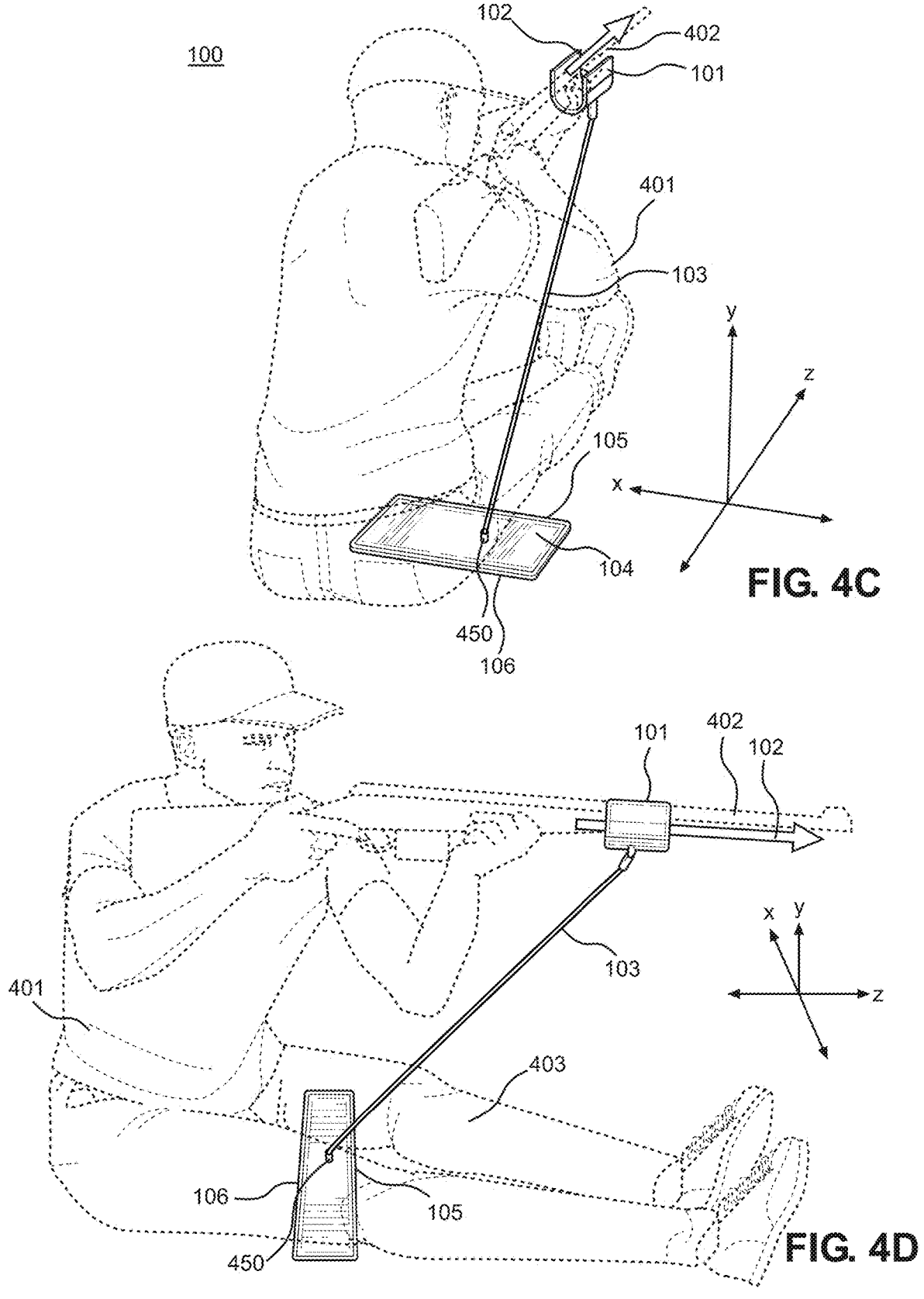
FIG. 4C is a back perspective environmental view of the underlap stabilizing stand illustrated in FIG. 1.
FIG. 4D is a side environmental view of the underlap stabilizing stand illustrated in FIG. 1.

FIGS. 4C and 4D illustrate an environmental view of the stand 100 whereby a user 401 is sitting on the base 104 with the longitudinal support 103 situated between their legs 403. The holder 101 is holding a rifle 402 at its forestock and the user 401 has tilted the longitudinal support forward to accommodate their desired positioning. As shown, the stand 100 may be structured to stabilize, position, and aim the elongate object 102 along the X, Y, and Z axes of the stand 100. In other words, the upper swivel 201, lower swivel 202, holder 101 and base 104 may be structured to allow a user to orient and aim a firearm 402 placed in the holder 101 in a forward, backward, sideways, upward and downward position relative to a user seated on the base 104.

Figures 5, 6:
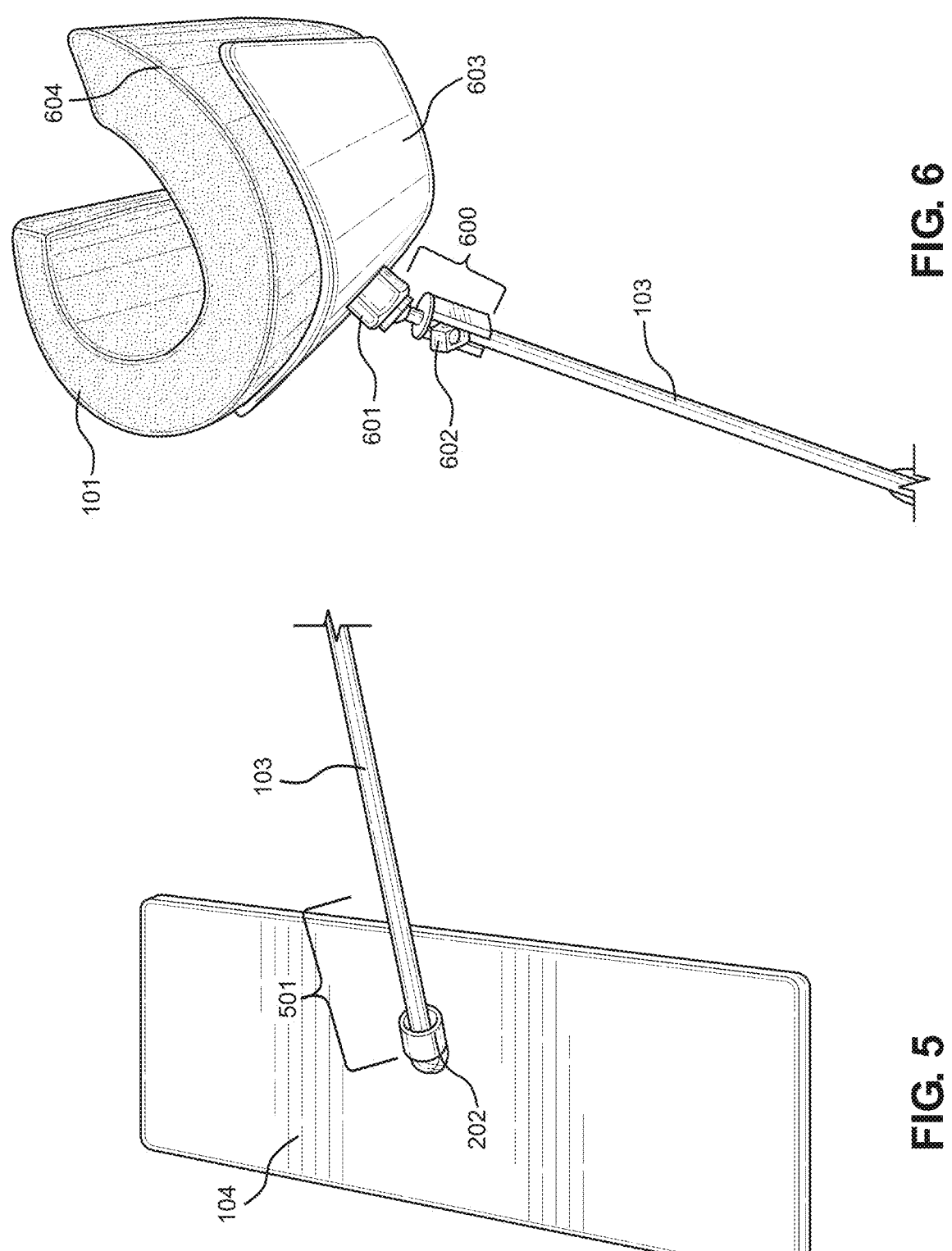
FIG. 5 is a segmented view of lower componentry of the underlap stabilizing stand illustrated in FIG. 1.
FIG. 6 is a segmented view of upper componentry of the underlap stabilizing stand illustrated in FIG. 1.

FIG. 5 takes a closer look at the bottom section of the stand 100 including the base 104, the longitudinal support 103 and the lower swivel 202. As shown, the base 104 includes space on either side of the longitudinal support 103 for a user to sit. The longitudinal support 103 may be positioned medially on top of the base 104. Here, the longitudinal support 103 is shown flush with the base 104 demonstrating that the lower swivel 202 has a 180-degree rotation ability in any orientation or direction 501. Also shown is that the lower swivel 202 has a tightener allowing it to secure the longitudinal support 103 in a desired position. This is advantageous for a hunter trying to place themselves in an optimal position for a target. It is also advantageous for the longitudinal support 103 to be tightened and laid flat against the base 104 to facilitate transport and storage.

FIG. 6 takes a closer look at the upper section of the stand 100 including the holder 101, upper swivel assembly 600 and the longitudinal support 103. As shown, the holder 101 may include a rigid coupling 603 and a soft support 604. The rigid coupling 603 may be semi-cylindrical and made out of a rigid, durable material such as metal, plastic, wood, or the like. It may serve as the support for the holder 101 while the soft support 604 may provide cushioning for the elongate object 102. By way of non-limiting example, the soft support 604 may be made of foam, dense fabric, or the like.

The upper swivel assembly 600 may include a first tightening component 601 and a second tightening component 602. Each component may be structured to reposition the holder 101. By way of non-limiting example, the first tightening component 601 may position the holder 101 in a vertical orientation and the second tightening component 602 may position the holder 101 in a vertical orientation or vice versa.

Figure 7A:
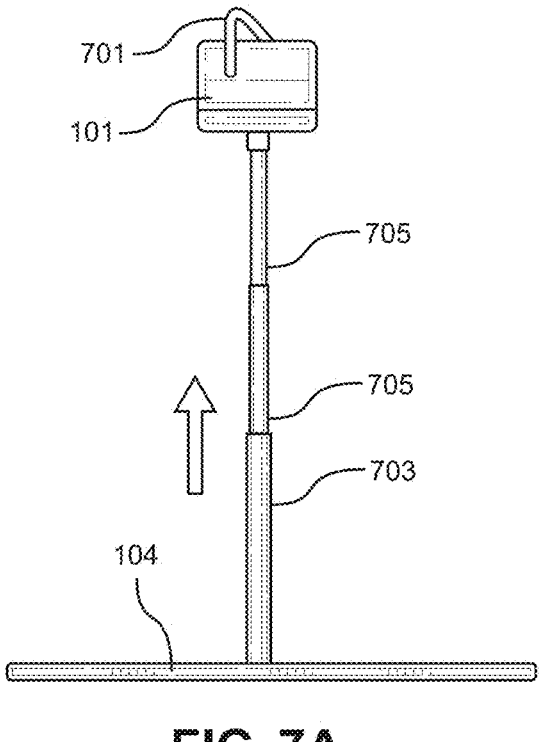
FIG. 7A is a side view of another embodiment of the underlap stabilizing stand.
Figure 7B:
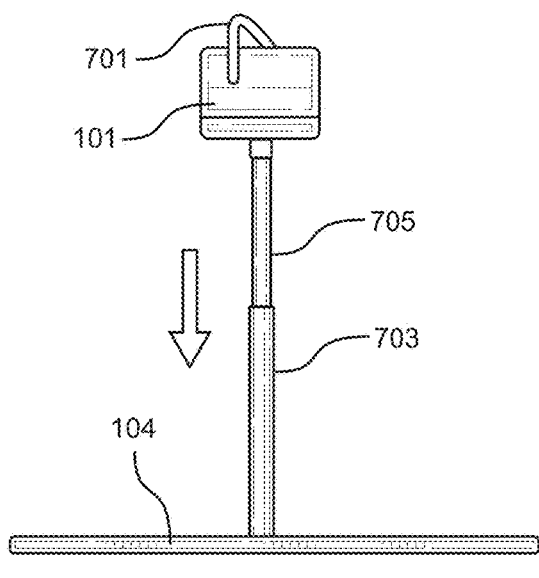
FIG. 7B is a side view of the embodiment of the underlap stabilizing stand illustrated in FIG. 7A in a different orientation.

FIGS. 7A and 7B illustrate an embodiment of the stand 100 with a securing strap 701 on the holder 101 and a telescopic longitudinal support 703.

The securing strap 701 may assist with holding an elongate object 102 in place while being used. In some embodiments, the securing strap 701 may be fixedly attached to a side of the holder 101 and removably attached to an opposing side of the holder 101. In other embodiments, the securing strap 701 may be removably attached to both sides of the holder 101.

The telescopic longitudinal support 703 may allow that component to be raised and lowered to a desired height. In other words, the telescopic longitudinal support 703 may be structured to be tightened and secured into a desired height anywhere between an extended first position and a compacted second position. In some embodiments, the telescopic longitudinal support 703 may be structured to tighten via at least one of a twist lock, clamp lock, and friction lock at segmented points 705 on the telescopic longitudinal support 703. One skilled in the art will understand and appreciate that a twist lock may utilize threading between portions of the longitudinal support to tighten, a clamp lock may utilize a clamp to tighten portions of the longitudinal support, and a friction lock may utilize smaller and larger fittings at portions to tighten the component at segments.

Figure 8A:
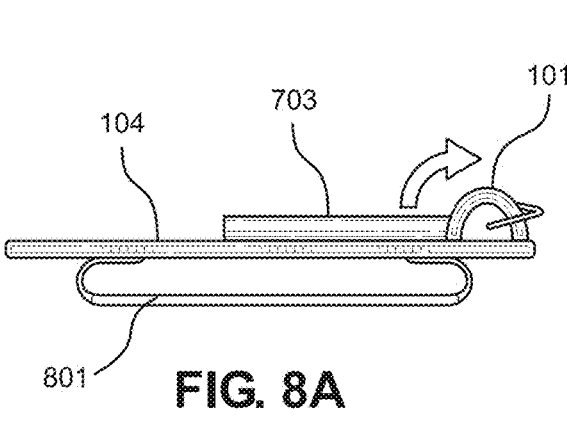
FIG. 8A is a side view of another embodiment of the underlap stabilizing stand.
Figure 8B:
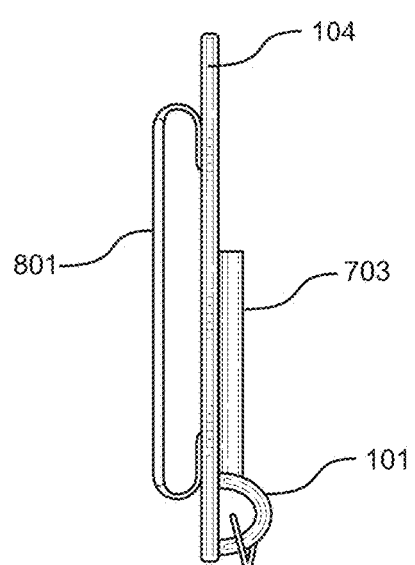
FIG. 8B is a side view of the embodiment of the underlap stabilizing stand illustrated in FIG. 8A.

FIGS. 8A and 8B illustrate that the telescopic longitudinal support 703 may be retracted completely into the compacted second position, tightened, and used in conjunction with the upper swivel 201 to rotate the holder 101 and lay the retracted longitudinal support 703 horizontally flush with the base 104 while utilizing swivel tighteners to secure it into position. This may assist with transportation and storage of the stand 100. Furthermore, in some embodiments, the stand 100 may include a pair of shoulder straps 801 permitting a user to transport the stand 100 on their back. In some embodiments the shoulder straps may be on an opposing surface of the base 104 than the lower swivel 202 and telescopic longitudinal support 703.

Figure 9:
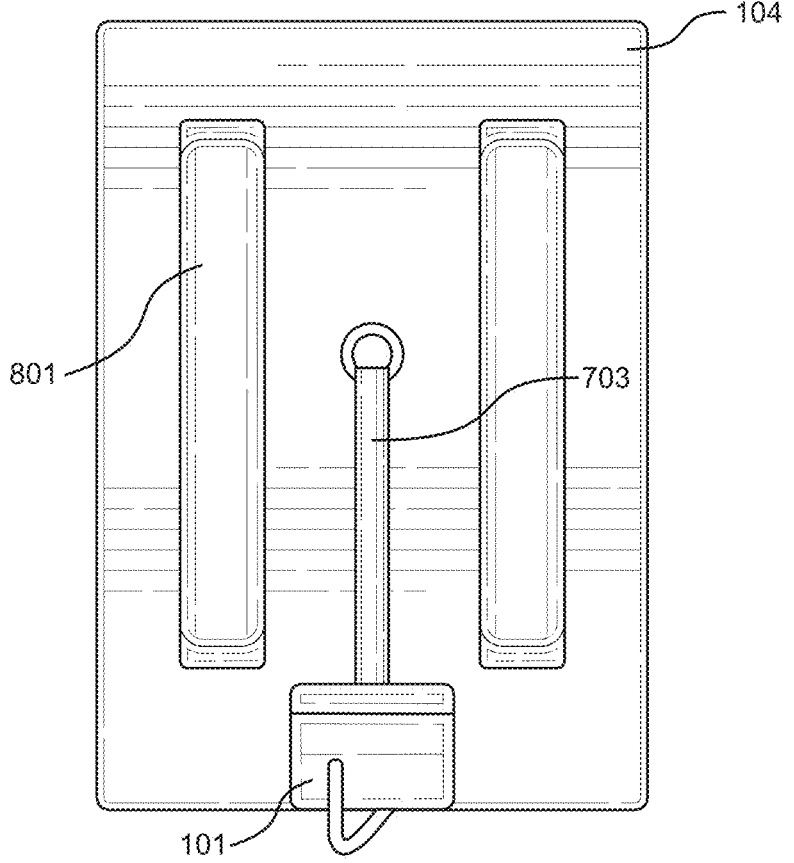
FIG. 9 is a top view of another embodiment of the underlap stabilizing stand.

FIG. 9 shows an embodiment of the stand 100 whereby shoulder straps 801 may be on the same surface as the lower swivel 202 and telescopic longitudinal support 703.

That which is claimed is:

1. An underlap stabilizing stand comprising:
   a holder,
   an upper swivel,
   a base,
   a lower swivel,
   a longitudinal support between the holder and the base,
   at least two shoulder straps attached to the base,
   wherein the holder is connected to the longitudinal support via the upper swivel;
   wherein the base is connected to the longitudinal support via the lower swivel;
   wherein the holder is configured to support an elongate object therein;
   wherein the underlap stabilizing stand is configured to stabilize, position and aim the elongate object along x, y, and z axes of the underlap stabilizing stand.

2. The underlap stabilizing stand of claim 1 wherein the holder is a semi-cylindrical open-ended cup.

3. The underlap stabilizing stand of claim 1 wherein the base is dimensioned to support the underside of a user's lap seated thereon.

4. The underlap stabilizing stand of claim 1 wherein the elongate object is a firearm.

5. The underlap stabilizing stand of claim 1 wherein the longitudinal support extends distally from the base center.

6. The underlap stabilizing stand of claim 1 wherein the base is rectangular and the longitudinal support is configured to rest between a user's legs.

7. The underlap stabilizing stand of claim 1 wherein a securing strap is fixedly attached to a side of the holder and removably attached to an opposing side of the holder.

8. The underlap stabilizing stand of claim 1 wherein the holder includes interior support padding.

9. The underlap stabilizing stand of claim 1 wherein the upper swivel and lower swivel include tightening components configured to secure the holder and the longitudinal support into a user selected position.

10. An underlap stabilizing stand comprising:
    a holder,
    an upper swivel,
    a base,
    a lower swivel,
    a telescopic longitudinal support between the holder and the base,
    at least two shoulder straps attached to the base,
    wherein the telescopic longitudinal support is configured to adjust between an extended first position and a compacted second position;
    wherein the holder is connected to the longitudinal support via the upper swivel;
    wherein the base is connected to the longitudinal support via the lower swivel;
    wherein the holder is configured to support an elongate object therein;
    wherein the underlap stabilizing stand is configured to stabilize, position and aim the elongate object along x, y, and z axes of the underlap stabilizing stand.

11. The underlap stabilizing stand of claim 10 wherein the upper swivel, lower swivel, holder and base are configured to allow a user to orient and aim a rifle placed in the holder in a forward, backward, sideways, upward and downward position relative to a user seated on the base.

12. The underlap stabilizing stand of claim 10 wherein the telescopic longitudinal support is configured to be tightened and secured into a desired height anywhere between the extended first position and the compacted second position.

13. The underlap stabilizing stand of claim 10 wherein the telescopic longitudinal support is configured to tighten via at least one of a twist lock, clamp lock, and friction lock at segmented points on the telescopic longitudinal support.

14. The underlap stabilizing stand of claim 10 wherein the telescopic longitudinal support is configured to tighten in the compacted second position and lay flat against the base to facilitate transport and storage.

15. The underlap stabilizing stand of claim 10 wherein a securing strap is removably attached to opposing sides of the holder.

16. An underlap stabilizing stand comprising:
    a holder,
    an upper swivel,
    a base,
    a lower swivel,
    a telescopic longitudinal support between the holder and the base,
    a pair of shoulder straps attached to the base,

wherein the telescopic longitudinal support is configured to adjust between an extended first position and a compacted second position;

wherein the holder is connected to the longitudinal support via the upper swivel;

wherein the base is connected to the longitudinal support via the lower swivel;

wherein the holder is configured to support an elongate object therein;

wherein the underlap stabilizing stand is configured to stabilize, position and aim the elongate object along x, y, and z axes of the underlap stabilizing stand.

17. The underlap stabilizing stand of claim 16 wherein the shoulder straps are fixedly attached to the base on a base surface opposite the lower swivel.

18. The underlap stabilizing stand of claim 16 wherein the shoulder straps are fixedly attached to the base on a base surface comprising the lower swivel.

19. The underlap stabilizing stand of claim 16 wherein the telescopic longitudinal support is configured to tighten in the compacted second position and lay flat against the base to facilitate transport and storage.

20. The underlap stabilizing stand of claim 16 wherein the telescopic longitudinal support is configured to tighten via at least one of a twist lock, clamp lock, and friction lock at segmented points on the longitudinal support.

* * * * *